(12) United States Patent
Iordanidis et al.

(10) Patent No.: US 10,259,570 B2
(45) Date of Patent: *Apr. 16, 2019

(54) AIRCRAFT ELECTRIC BRAKING SYSTEM

(71) Applicant: AIRBUS OPERATIONS LIMITED, Bristol (GB)

(72) Inventors: George Iordanidis, Bristol (GB); John Rees, Bristol (GB)

(73) Assignee: Airbus Operations Limited, Bristol (GB)

( * ) Notice: Subject to any disclaimer, the term of this patent is extended or adjusted under 35 U.S.C. 154(b) by 385 days.

This patent is subject to a terminal disclaimer.

(21) Appl. No.: 14/554,609

(22) Filed: Nov. 26, 2014

(65) Prior Publication Data

US 2015/0291280 A1 Oct. 15, 2015

(30) Foreign Application Priority Data

Nov. 27, 2013 (GB) .................................. 1320941.6

(51) Int. Cl.
*B64C 25/44* (2006.01)
*B60T 8/17* (2006.01)
*B64C 25/46* (2006.01)

(52) U.S. Cl.
CPC ............ *B64C 25/44* (2013.01); *B60T 8/1703* (2013.01); *B64C 25/46* (2013.01); *B60T 2270/413* (2013.01)

(58) Field of Classification Search
CPC .......................... B64C 25/46; B60T 2270/413
See application file for complete search history.

(56) References Cited

U.S. PATENT DOCUMENTS

| | | | |
|---|---|---|---|
| 6,003,640 A | 12/1999 | Ralea | |
| 6,115,656 A | 9/2000 | Sudolsky | |
| 6,142,580 A * | 11/2000 | Sinn | ....................... B60T 13/665 |
| | | | 174/113 R |
| 6,183,051 B1 | 2/2001 | Hill et al. | |
| 6,203,116 B1 | 3/2001 | Dieckmann | |
| 6,296,325 B1 | 10/2001 | Corio et al. | |

(Continued)

FOREIGN PATENT DOCUMENTS

| | | |
|---|---|---|
| EP | 1 484 244 A1 | 12/2004 |
| EP | 2 284 054 | 2/2011 |

(Continued)

OTHER PUBLICATIONS

Extended Search Report in European Patent Application No. 14195206.9 dated Apr. 8, 2015, seven pages.

(Continued)

*Primary Examiner* — Brian M O'Hara
*Assistant Examiner* — Keith L Dixon
(74) *Attorney, Agent, or Firm* — Nixon & Vanderhye P.C.

(57) ABSTRACT

An electrically actuated braking system for an aircraft, comprising: an electro-mechanical brake actuator (EMAbrake) proximate a wheel of the aircraft, the EMAbrake including a motor; an electro-mechanical actuator controller (EMAC) including a motor controller for generating a drive signal for the EMAbrake; and a braking control unit for generating a braking force command signal for the EMAC, wherein the braking control unit and the EMAC are disposed together with the EMAbrake in a common line replaceable unit (LRU).

22 Claims, 11 Drawing Sheets

(56) References Cited

U.S. PATENT DOCUMENTS

| | | | |
|---|---|---|---|
| 6,402,259 B2 | 6/2002 | Corio et al. | |
| 6,416,140 B1 | 7/2002 | Yamamoto et al. | |
| 6,471,015 B1 | 10/2002 | Ralea et al. | |
| 8,332,114 B2 * | 12/2012 | Whittingham | B60T 8/1703 244/111 |
| 8,666,627 B2 * | 3/2014 | May | B60T 8/1703 701/71 |
| 8,733,847 B2 * | 5/2014 | Thibault | B60L 7/003 303/122.04 |
| 9,028,014 B2 * | 5/2015 | Clary | B60T 8/1703 303/126 |
| 9,227,608 B2 * | 1/2016 | Hill | B60T 8/1703 |
| 9,555,782 B2 * | 1/2017 | Iordanidis | B60T 8/17 |
| 9,611,035 B2 * | 4/2017 | Iordanidis | B60T 8/1703 |
| 2001/0045771 A1 | 11/2001 | Corio et al. | |
| 2005/0110339 A1 | 5/2005 | Kolberg | |
| 2005/0148327 A1 | 7/2005 | Perez et al. | |
| 2006/0061210 A1 | 3/2006 | Ralea | |
| 2006/0108867 A1 | 5/2006 | Ralea | |
| 2007/0235267 A1 | 10/2007 | Liebert | |
| 2008/0030069 A1 | 2/2008 | Griffith et al. | |
| 2008/0133073 A1 * | 6/2008 | Griffith | B60T 13/746 701/9 |
| 2008/0179146 A1 | 7/2008 | Sullivan | |
| 2008/0258548 A1 | 10/2008 | May et al. | |
| 2008/0302813 A1 | 12/2008 | Yanagisawa et al. | |
| 2009/0276133 A1 | 11/2009 | May et al. | |
| 2009/0278401 A1 | 11/2009 | Summers et al. | |
| 2010/0070150 A1 | 3/2010 | May | |
| 2010/0078519 A1 | 4/2010 | Cahill | |
| 2010/0106347 A1 | 4/2010 | Cahill | |
| 2010/0274458 A1 | 10/2010 | Cahill et al. | |
| 2010/0276988 A1 | 11/2010 | Cahill | |
| 2010/0280725 A1 | 11/2010 | Cahill | |
| 2011/0040466 A1 | 2/2011 | Hill et al. | |
| 2011/0100769 A1 | 5/2011 | Frank | |
| 2011/0155521 A1 | 6/2011 | Thibault et al. | |
| 2011/0226569 A1 | 9/2011 | Devlieg | |
| 2012/0065816 A1 | 3/2012 | Cahill | |
| 2012/0145490 A1 | 6/2012 | Clary et al. | |
| 2012/0175198 A1 | 7/2012 | Thibault et al. | |
| 2012/0217339 A1 | 8/2012 | Gilleran et al. | |
| 2012/0325573 A1 | 12/2012 | Miller | |
| 2013/0175403 A1 | 7/2013 | Spray | |
| 2013/0253736 A1 | 9/2013 | Frank | |
| 2015/0151728 A1 | 6/2015 | Iordanidis et al. | |
| 2015/0291279 A1 | 10/2015 | Iordanidis et al. | |

FOREIGN PATENT DOCUMENTS

| | | |
|---|---|---|
| EP | 2 463 166 | 6/2012 |
| GB | 2 444 630 | 6/2008 |
| GB | 2 460 323 | 12/2009 |
| GB | 2469702 | 10/2010 |
| GB | 2469891 | 11/2010 |
| WO | 01/05655 | 1/2001 |
| WO | WO 2008/052051 | 5/2008 |
| WO | WO 2008/144378 | 11/2008 |
| WO | 2009/125213 | 10/2009 |
| WO | WO 2013/119242 | 8/2013 |

OTHER PUBLICATIONS

U.S. Search Report for GB Application No. 1320941.6, dated Jun. 12, 2014, Jason Clee, 1 page.

Search Report for GB Application No. 1320938.2, dated Jun. 12, 2014, Jason Clee, 1 page.

European Search Report cited in EP 14 19 5200 completed Mar. 18, 2015, 6 pages.

Search Report for GB Application No. 1320939.0, dated Jun. 12, 2014, Jason Clee, 1 page.

Extended Search Report in European Patent Application No. 14195202.8 dated Apr. 7, 2015, 7 pages.

* cited by examiner

Table 1

| Functional Block | Description |
|---|---|
| A/C COCKPIT CONTROLS & AVIONICS | A/C Cockpit Controls and Aircraft Avionics |
| BCU | Brake Control Unit |
| Router | Data Bus Router |
| eBCU | Emergency Brake Control Unit |
| EBPSU | Electric Brake Power Supply Unit |
| EMA|EM/AC| or EMA|EM/AC| or EMA|EM/AC| | Fully Smart Electro-Mechanical Actuator |
| Wheel & Brake | Wheel & Brake |

FIG. 13

AIRCRAFT ELECTRIC BRAKING SYSTEM

CROSS-REFERENCE TO RELATED APPLICATION

This application claims priority to GB Application No. 1320941.6, filed 27 Nov. 2013, the entire content of which is hereby incorporated by reference.

FIELD OF THE INVENTION

The present invention relates to an electrically actuated braking system for an aircraft.

BACKGROUND OF THE INVENTION

Electric systems are gradually replacing hydraulic systems on many commercial, and military, aircraft. Current "brake by wire" aircraft systems may have a generally centralized architecture in which pilot inputs are interpreted and command and monitoring signals are communicated via a databus and as analogue/discrete signals to a brake control unit (BCU). An exemplary centralized architecture is described in US 2008/0030069 A1.

The BCU interprets the commands from the aircraft cockpit controls and avionics and calculates braking force commands for each actuated landing gear wheel of the aircraft. This may include fast loop anti-skid control.

Each braking wheel will have at least one electro-mechanical actuator (EMA) for providing a clamping force to the brake for that wheel, which converts the clamping force to a braking torque. Electro-mechanical actuator controllers (EMACs) may be disposed within the landing gear bay and electrically connected to a plurality of brake EMAs coupled to wheel and brake groups. Typically, each wheel and brake group includes a plurality of brake EMAs coupled via a brake assembly to a wheel. The EMACs interpret the brake force commands from the BCU and receive electrical power to provide power to drive the EMAs.

Typically at least two BCUs are provided. The plurality of BCUs may be arranged for redundancy and/or fault tolerance. In a redundant configuration, the BCUs may be assigned to particular sides, e.g. aircraft avionics network side or electrical power network side. The EMACs may therefore receive brake force commands from any BCU. To maximize commonality of parts the EMACs may all be identical so as to minimize the cost and complexity of design, manufacture, installation, repair, replacement, etc. of parts. There is a therefore a potential for simultaneous failure of several EMACs leading to partial or full loss of braking control, which is undesirable. The EMAC may be considered a "complex" part, i.e. it is not fully testable, as defined in ARP4754.

SUMMARY OF THE INVENTION

The invention provides an electrically actuated braking system for an aircraft, comprising: an electro-mechanical brake actuator (EMAbrake) proximate a wheel of the aircraft, the EMAbrake including a motor; an electro-mechanical actuator controller (EMAC) including a motor controller for generating a drive signal for the EMAbrake; and a braking control unit for generating a braking force command signal for the EMAC; wherein the braking control unit and the EMAC are disposed together with the EMAbrake in a common line replaceable unit (LRU).

The invention is advantageous in that the common LRU enables reduced wiring complexity to the EMAbrake, providing weight and cost savings and enhanced reliability compared to previous electrically actuated braking systems.

The braking control unit may be at least one of: a normal mode braking control unit (BCU) configured to generate a braking force command signal for the EMAC during a normal mode of operation; and an emergency mode braking control unit (eBCU) configured to generate a braking force command signal for the EMAC during an emergency mode of operation.

The BCU and/or the eBCU may be operable to perform anti-skid brake control.

In a series of embodiments, the system includes at least one normal mode braking control unit (BCU) configured to generate a braking force command signal for the EMAC during a normal mode of operation; and at least one an emergency mode braking control unit (eBCU) configured to generate a braking force command signal for the EMAC during an emergency mode of operation. In an embodiment where the common LRU has one or more BCUs but no eBCU, one or more eBCUs may be disposed remote from the LRU. In another embodiment where the common LRU has one or more eBCUs but no BCU, one or more BCUs may be disposed remote from the LRU. In a further embodiment the common LRU has at least one BCU and at least one eBCU.

The EMAC may include a plurality of motor controllers. In one example the EMAC may include a first motor controller for generating a first drive signal for the EMAbrake, and a second motor controller for generating a second drive signal for the EMAbrake.

The first motor controller and the second motor controller may each comprise hardware for generating a pulse-width modulation signal.

The first motor controller and the second motor controller may include similar hardware for generating a pulse-width modulation signal. Alternatively, the first motor controller and the second motor controller may include dissimilar hardware for generating a pulse-width modulation signal so as to provide protection against common mode failure of the first and second motor controllers.

The first motor controller and the second motor controller may each comprise similar or dissimilar hardware selected from the group comprising: a microprocessor, a microcontroller, a digital signal processor, an application specific integrated circuit, a programmable logic device, a complex programmable logic device, a field programmable gate array, and a transistor based discrete electronics switching circuit.

The BCU may be operable on a normal brake channel, and the eBCU may be operable on an emergency brake channel.

The first motor controller may be operable on a normal motor control channel, and the second motor controller may be operable on an emergency motor control channel.

The BCU may be configured to communicate with the first motor controller and not the second motor controller, and the eBCU may be configured to communicate with the second motor controller and not the first motor controller.

For example, the normal brake channel and the normal motor control channel may be coupled so as to form a normal channel, and the emergency brake channel and the emergency motor control channel may be coupled so as to form an emergency channel, and the system may further comprise a switch for switching between the normal channel and the and emergency channel.

Alternatively, the BCU may be configured to communicate with either the first motor controller or the second motor controller, and the eBCU may be configured to communicate with either the first motor controller or the second motor controller.

A first switch may be provided for switching between the normal and emergency brake channels, and a second switch may be provided for switching between the normal and emergency motor control channels. The first switch and the second switch may be independently switchable.

A source switch may be operatively coupled between the normal and emergency motor control channels and the EMAbrake for switching the EMAbrake control depending on the selected motor control channel. Alternatively, an OR gate may be operatively coupled between the normal and emergency motor control channels and the EMAbrake for controlling the EMAbrake depending on the operative motor control channel.

The BCU may include redundant brake control channels each for communicating with aircraft cockpit controls and avionics via a respective databus.

Also, an aircraft including the electrically actuated braking system above.

A plurality of the common LRUs may be associated with a braked wheel of the aircraft, i.e. a wheel brake assembly for a landing gear wheel may be actuated by a plurality of the EMAbrakes, each EMAbrake forming part of the respective common LRU also having the EMAC and BCU and/or eBCU.

Where the BCU/eBCU of each common LRU is operable to perform anti-skid, the anti-skid control may be at an EMAbrake level not on a per wheel basis. Where a plurality of the common LRUs are associated with each braked wheel of the aircraft and the anti-skid is at EMAbrake level the anti-skid control may be synchronized between all of the EMAbrakes (LRUs) associated with the respective braked wheel. The synchronization requires communication between the EMAbrakes associated with the respective braked wheel.

The common LRU may be configured to handle only digital communications external to the LRU, e.g. via a digital databus, and not analogue communications.

The electrically actuated braking system may further include a router for routing digital communications between aircraft cockpit controls and aircraft avionics and the fully smart EMA. The router may be located at the base of a landing gear leg, i.e. adjacent the axle/slider of the landing gear.

BRIEF DESCRIPTION OF THE DRAWINGS

Embodiments of the invention will now be described with reference to the accompanying drawings, in which:

FIG. 13 presents Table 1 which lists a brief description of the function blocks illustrated in the Figures.

DETAILED DESCRIPTION OF EMBODIMENT(S)

Figure 1:
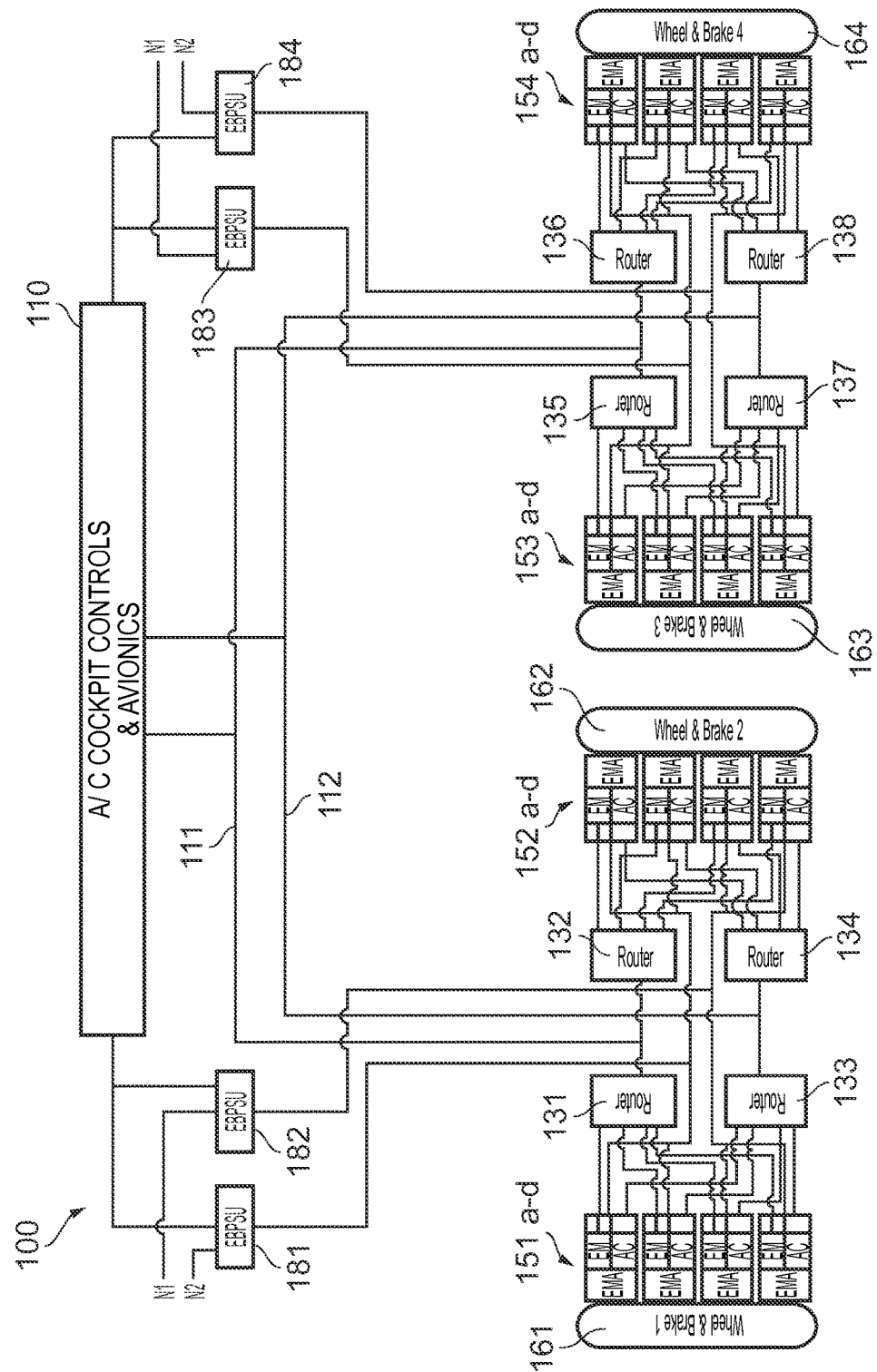
FIG. 1 illustrates a first embodiment of a fully distributed electrically actuated aircraft braking system architecture including "fully smart" electro-mechanical actuators (EMAs) including electro-mechanical actuator controllers (EMACs), braking control units (BCU) and an emergency braking control unit (eBCU)

The electrically actuated aircraft braking system 100 of the first embodiment shown in FIG. 1 is configured for an aircraft having two braked main landing gears, one on either side of the aircraft center line. However, it will be appreciated that the invention described herein relates to any aircraft configuration having braking wheels, including aircraft with more than two main landing gears and/or braked nose landing gear. The braking system 100 features fully distributed avionics.

The braking system 100 includes aircraft cockpit controls and aircraft avionics 110 which communicates via databuses 111, 112 and routers 131-138 with "fully smart" electro-mechanical brake actuators (EMAs) 151a-d, 152a-d, 153a-d, and 154a-d (described in detail below) associated with wheel and brake groups 161-164. In this example there are four wheel and brake groups (one per wheel of two diablo main landing gears), and four fully smart EMAs per wheel and brake group. Electric brake power supply units 181-184 are arranged to supply power to the fully smart EMAs. Of course, there may be a greater or fewer number of wheel and brake groups and fully smart EMAs.

Figure 4:
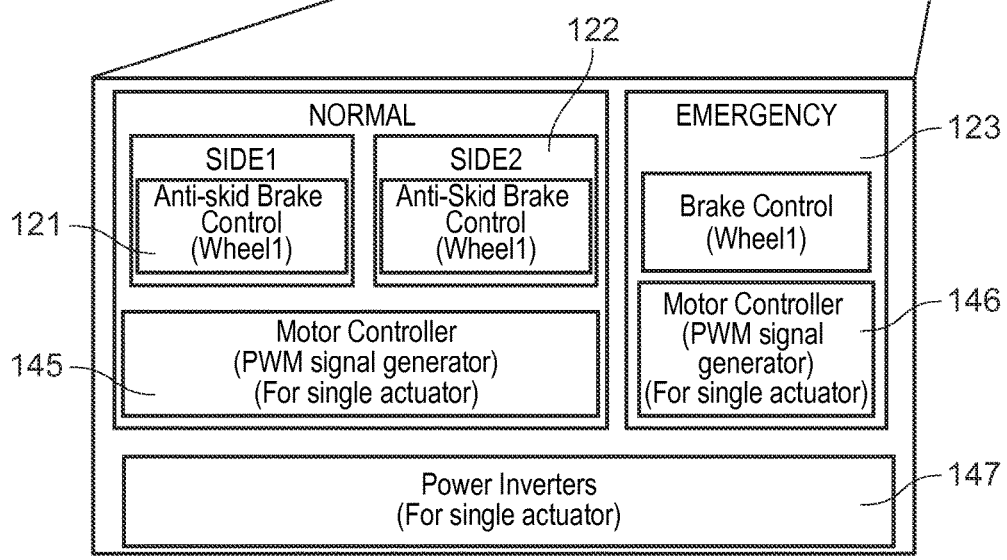
FIG. 4 illustrates a schematic of the fully smart EMA of the first embodiment having dissimilar normal and emergency motor controllers and integrated BCU and eBCU functionality.

As best shown in FIG. 4 the braking system 100 comprises both a normal and an emergency system. The normal system includes dual redundant brake control units (BCUs) 121, 122 assigned to particular sides, e.g. aircraft avionics network or electrical power network sides (side1, side2, etc.). The emergency system includes an emergency BCU (eBCU) 123. The eBCU 123 provides protection against the loss of function of both BCUs 121, 122, e.g. from failure of the BCUs, failure of the aircraft avionics, failure of the communications databus, and also possibly failure of a power supply (depending on the power supply configuration)—all of which could lead to a loss of function for the BCU.

The fully smart EMAs 151a-d, 152a-d, 153a-d and 154a-d each include, in addition to the brake EMA 191, the side1 BCU, side2 BCU and eBCU function blocks packaged together with EMA controller (EMAC) function blocks within a single line replaceable unit (LRU).

The BCUs 121, 122 receive input from aircraft cockpit controls and avionics 110 via databus 111 and the eBCUs 123 receive input from aircraft cockpit controls and avionics 110 via databus 112. The databus 112 may be dissimilar to the databus 111. Alternatively, the databus 112 may be replaced by routes carrying analogue and/or discrete signals, e.g. from a brake pedal transmitter unit (BPTU) indicating a brake pedal angle. Note that not all signal routes are shown in the figures so as not to obscure the clarity of the description of the invention.

Figure 2:
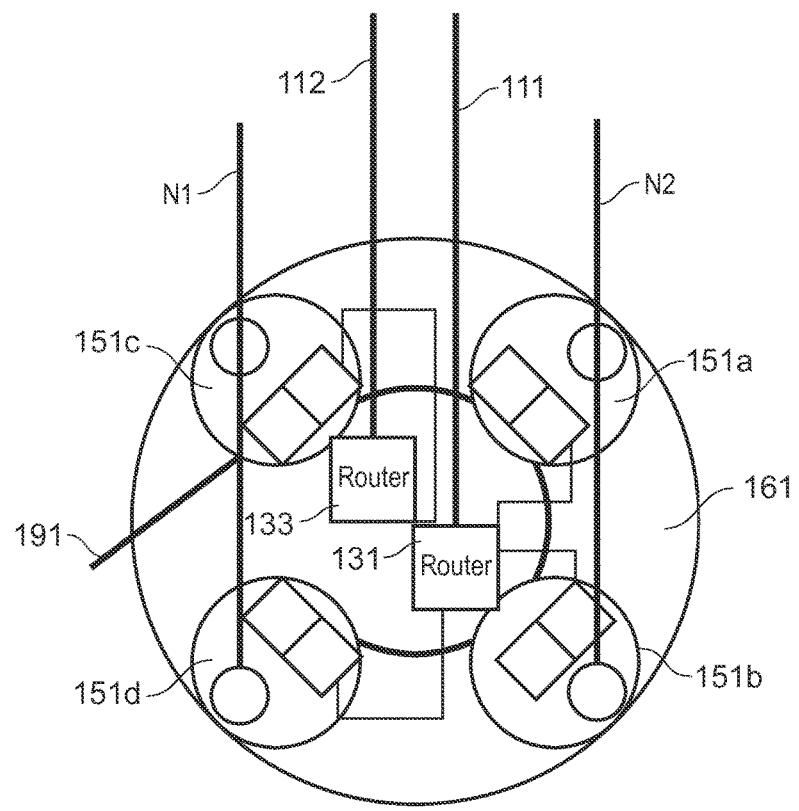
FIG. 2 illustrates a schematic of one of the landing gear wheel brakes in the first embodiment including four of the fully smart EMAs and their connections.

In the configuration shown in FIGS. 1 and 2 only databus 111 (and not databus 112) is operable during the normal mode of operation. In the emergency mode of operation the databus 111 is inactive and the databus 112 is active. The emergency databus may have reduced functionality (e.g. slower speed) as compared with the normal mode databus. In an alternative configuration the databuses 111 and 112 may be switched so that only one of databus 111 and databus 112 is active at any time but databus 111 may be used in the normal and the emergency modes and similarly databus 112 may be used in the normal and the emergency modes.

The BCUs 121, 122 interpret signals from the aircraft cockpit controls and avionics 110 and issue braking force commands on a per wheel basis to motor controllers within the EMAC function block 141 of the respective fully smart EMA.

The routers 131-138 route digital databus signals from the aircraft cockpit controls and aircraft avionics 110 to the fully smart EMAs (and vice versa). The four fully smart EMAs associated with each wheel and brake group communicate via a first router with databus 111 and via a second router with databus 112. For example, in the configuration shown in FIG. 1 communications between the aircraft cockpit controls and aircraft avionics 110 and the four EMAs 151a-d of wheel and brake group 1 (161) in the normal mode are routed via databus 111 and router 131. Communications between the aircraft cockpit controls and aircraft avionics 110 and the four EMAs 151a-d of wheel and brake group 1 (161) in the emergency mode are routed via databus 112 and router 133. In this way each wheel and brake group is associated with four fully smart EMAs, and two routers—one normal mode router which communicates via normal mode databus 111 and one emergency mode router which communicates via emergency mode databus 112.

The EMAC function blocks 141 of each fully smart EMA include motor controllers 145, 146 and a power inverter stage 147. The motor controllers 145, 146 interpret brake force commands from the BCUs 121, 122 and generate a drive signal for the EMA 191. The power stage 147 powers the EMA 191 and is electrically connected to the aircraft power networks N1, N2 (note only the high voltage parts of the aircraft power networks N1, N2 are shown in FIG. 1) via the EBPSUs. The EBPSUs may include a safety power interlock, and may further include power source switching and/or power conversion, if required. The EMAC function block 141 therefore provides power and control signals to drive the EMA 191 within each fully smart EMA.

The BCUs 121, 122 within each fully smart EMA perform fast loop anti-skid control for their respective wheel and brake on a per EMA basis. In the configuration shown in FIG. 4 there are four fully smart EMAs per wheel and brake. Accordingly the anti-skid control between each of the four EMAs associated with the same wheel and brake may be synchronized. Depending on the speed of the communications required for effective anti-skid control the four fully smart EMAs, the EMAs may communicate directly with each other or may route communications via the databus network. In some circumstances synchronization of anti-skid control between fully smart EMAs associated with the same wheel and brake may not be required.

The EMA 191 of each fully smart EMA converts the electrical power from the EBPSUs into mechanical power to provide a clamping force to the brake associated with its respective wheel. The wheel and brake assembly converts the clamping force applied by the EMA into braking torque so as to decelerate or hold stationary the aircraft.

The EMAC function blocks 141 of each fully smart EMA include a primary, or first, motor controller for driving the motor of the EMA 191 with which it is associated. To protect against the eventuality of a simultaneous failure of the motor controllers in the normal channel of the EMAC function blocks 141, due to a common mode failure at actuator control level, the EMAC function blocks further comprise a secondary, or second, motor controller. The primary motor controller forms part of a normal channel of the EMAC function blocks, and the secondary motor controller forms part of an emergency channel of the EMAC function blocks. The motor controller is the complex part of the EMAC function blocks, and so a dissimilar motor controller is incorporated within the EMAC function blocks to form part of the emergency channel.

The eBCU 123 within each fully smart EMA outputs brake control signals for the respective wheel and brake 161, 162, 163, 164 with which it is associated. The eBCU 123 is operable to perform the same functions as the BCUs 121, 122 but is in use only when the system is in emergency mode. The eBCU 123 may comprise simpler technology, or may receive and output analogue signals only depending on the architecture. The eBCU 123 preferably performs fast loop anti-skid control for the braking wheel of the wheel and brake group with which it is associated. The eBCU may be based upon dissimilar technology to the BCU for protection against common mode failures. The eBCU anti-skid control, where provided, is on a per EMA basis and so anti-skid control synchronization between fully smart EMAs associated with the same wheel and brake may be required as explained above with reference to the BCUs.

FIG. 2 illustrates schematically the physical arrangement of the four fully smart EMAs 151a-d in the brake assembly of the wheel and brake 161. The fully smart EMAs 151a and 151b are powered by aircraft power network N2 (via EBPSU 182) and the fully smart EMAs 151c and 151d are powered by aircraft power network N1 (via EBPSU 181). Communications between the aircraft cockpit controls and aircraft avionics and all four fully smart EMAs 151a-d are routed either via databus 111 and router 131, or via databus 112 and router 133. As explained above the databus 111 and router 131 are designated for the normal mode and databus 112 and router 133 are designated for the emergency mode in this configuration. Router 131 communicates with each of the four fully smart EMAs 151a-d and router 133 communicates with each of the four fully smart EMAs 151a-d.

In the configuration shown in FIG. 2 the routers 131, 133 are located at or adjacent the bottom of the landing gear leg, e.g. on the slider/axle or adjacent the wheel with which they are associated. This significantly reduces the wiring weight and complexity of the braking system since the databuses 111, 112 can be run all the way down the landing gear leg from the landing gear bay. However, the environment at the bottom of the landing gear leg is particularly harsh and so in some circumstances it may be desirable to locate the routers in the landing gear bay or in the avionics bay or in another location within the aircraft remote from the bottom of the landing gear leg. In such circumstances it may be necessary to provide relatively long local databus cabling runs between the routers and each of the fully smart EMAs so increasing the wiring complexity and therefore weight and cost as compared with the configuration shown in FIG. 2.

The fully smart EMAs are preferably capable of handling only digital communications with the aircraft cockpit controls and aircraft avionics. This is a significant departure from previous EMAs which require analogue communications. The ability of the fully smart EMAs to handle only digital communications combined with locating the routers at the bottom of the landing gear leg means that only digital databuses are required down the landing gear leg, which reduces wiring weight, complexity and cost and improves reliability. However, the fully smart EMAs could alternatively communicate with the aircraft cockpit controls and aircraft avionics via analogue routes.

The fully smart EMAs capable of handling only digital communications beneficially contributes to lowering the maintenance requirement of the braking system since each fully smart EMA need only be connected via a local databus (to the routers) and a power cable (to the aircraft power network/braking power supply). The fully smart EMA is therefore a plug and play device. Each of the fully smart EMAs in the braking system are preferably identical so as to reduce parts count and inventory requirements. To safeguard against common mode failures the fully smart EMAs include hardware arranged to provide the requisite redundancy by dissimilar technologies as will be described below.

Figure 3:
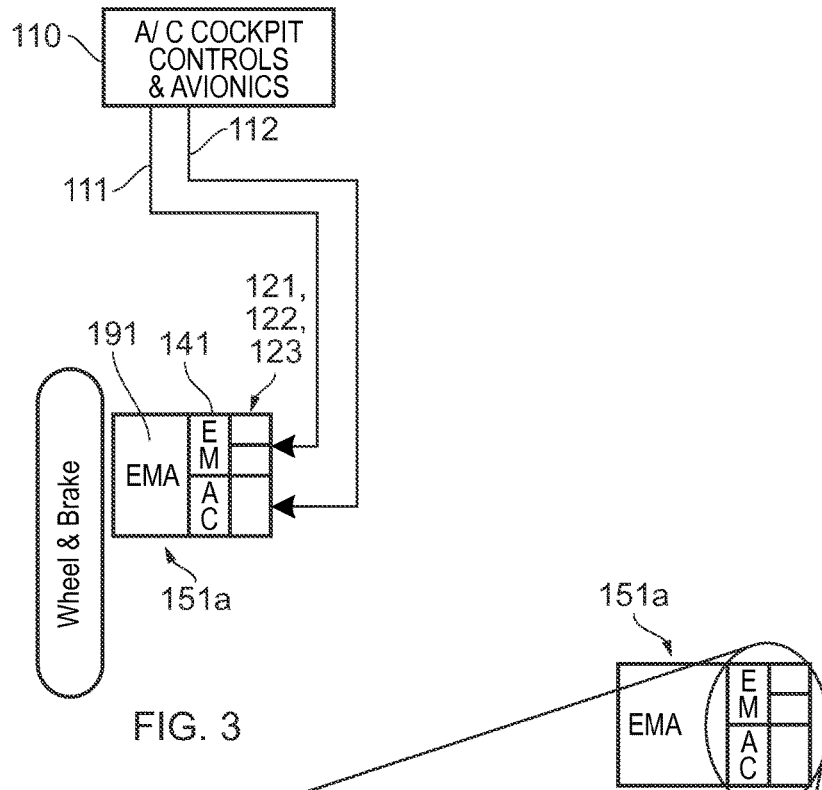
FIG. 3 illustrates a schematic of the control of a single fully smart EMA of the first embodiment.

FIG. 3 illustrates a schematic of the control of a single fully smart EMA 151a in the first embodiment. The fully smart EMA includes EMA 191, EMAC 141, side 1 and side 2 BCUs 121, 122 and eBCU 123. The EMAC and BCU/eBCU are operable to compute brake force commands on a per wheel basis based on the databus 111, 112 signals from the aircraft cockpit control and avionics 110. Although not shown in FIG. 3, the fully smart EMA 151a also receives electrical power from power network N2, as discussed above. Although only fully smart EMA 151 is shown, all of the fully smart EMAs are structurally and functionally similar and connected as shown in FIG. 1.

FIG. 4 illustrates schematically the normal and emergency channels within the fully smart EMA 151a. In the normal channel, the fully smart EMA includes a side1 BCU function block 121, a side2 BCU function block 122, and a normal (primary) motor controller 145 which is a pulse-width modulation (PWM) signal generator for its associated EMA 191. In the emergency channel, the fully smart EMA includes an eBCU function block 123 and an emergency (secondary) motor controller 146 which is a PWM signal generator for its EMA 191. The fully smart EMA also includes a power inverter 147 for its EMA 191. The side1 and side 2 BCU function blocks 121, 122 include fast-loop anti-skid control. The eBCU function block may or may not also include fast-loop anti-skid control.

Figures 5, 6:
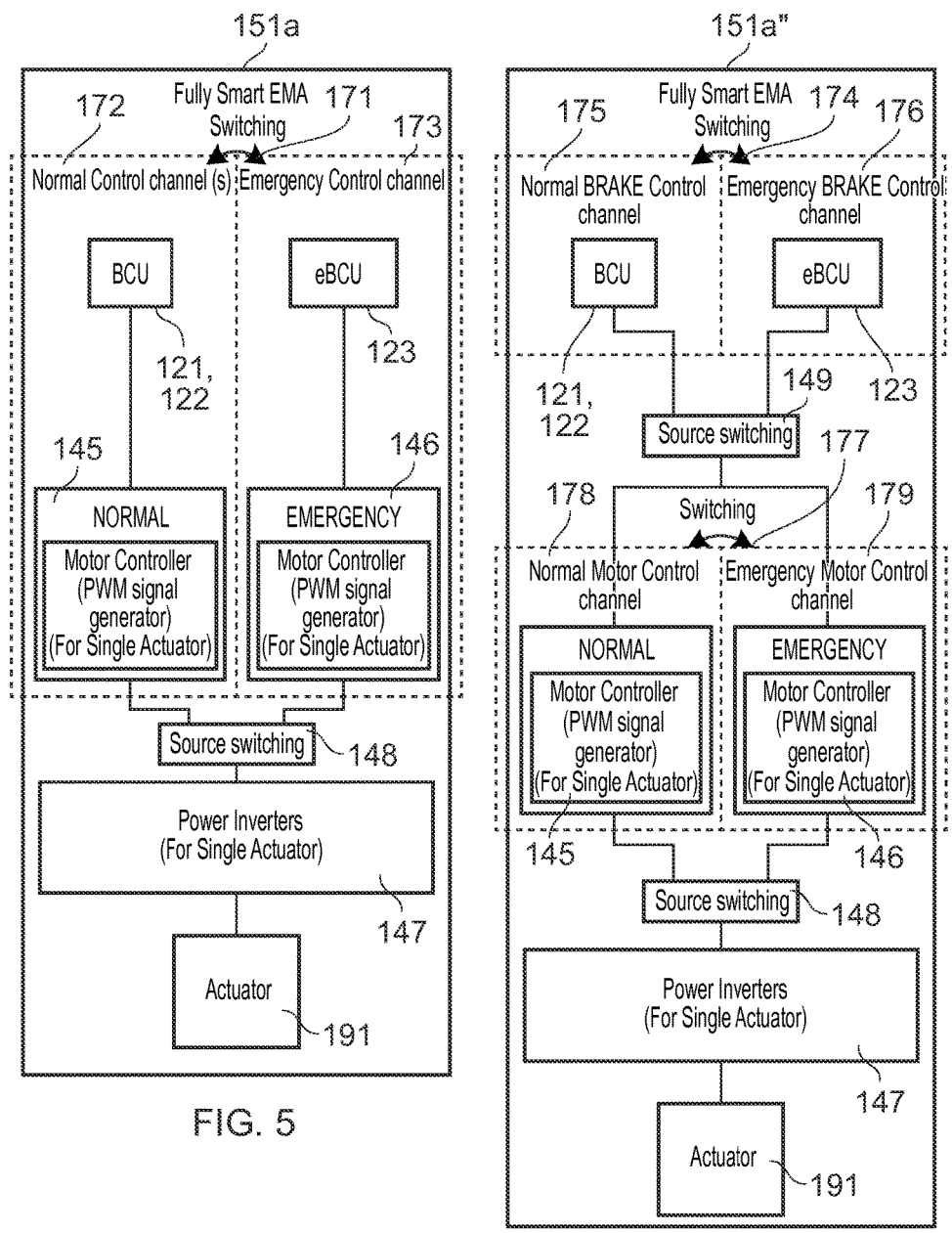
FIG. 5 illustrates a first example of a control scheme for the fully smart EMA shown in FIG. 4.
FIG. 6 illustrates a second example of a control scheme for the fully smart EMA shown in FIG. 4.

FIG. 5 illustrates a first example of a control scheme for the fully smart EMA 151a shown in FIG. 4. In this configuration the braking system control is switched 171 unitarily between normal 172 and emergency 173 channels such that the when the brake control channel is switched from the normal channel (though the BCU function block 121/122) to the emergency channel (through the eBCU function block 123) the motor control channel is also switched from the normal channel (through the primary motor controller 145) to the emergency channel (through the secondary motor controller 146). In this way the normal brake control channel always communicates with the normal motor control channel, and the emergency brake control channel always communicates with the emergency motor control channel.

As shown in FIG. 5 the fully smart EMA further includes a source switch 148 for switching between the normal and emergency channels as both channels may be continuously transmitting. In a simplified arrangement an OR gate may be used in place of the source switch 148 if the control channels are not continuously transmitting.

FIG. 6 illustrates a second example of a control scheme for the fully smart EMA 151a (denoted here 151a") shown in FIG. 4. In this configuration the active brake control channel of the BCU/eBCU function blocks and the active motor control channel of the fully smart EMA may be switched independently depending on failure conditions. Therefore the normal brake control channel (though the BCU 121/122 function blocks) may communicate with either the normal motor channel (through the primary motor controller 145) or the emergency motor channel (through the secondary motor controller 146). Similarly, the emergency brake control channel (though the eBCU function block 123) may communicate with either the normal motor channel (through the primary motor controller 145) or the emergency motor channel (through the secondary motor controller 146). Unlike the FIG. 5 control scheme, in FIG. 6 the brake channel control is switched 174 between normal (BCU function block) 172 and emergency (eBCU function block) 173 channels, and the source switch 148 is arranged to switch between the outputs from the normal and emergency motor controllers 145, 146. The fully smart EMA 151a" further includes a source switch 149 for switching 177 the brake control received from either the BCU function blocks 121, 122 or the eBCU function block 123 to either the normal motor control channel 178 or the emergency motor control channel 179. In a simplified arrangement an OR gate may be used in place of the source switches 148, 149 if the control channels are not continuously transmitting.

Figure 7:
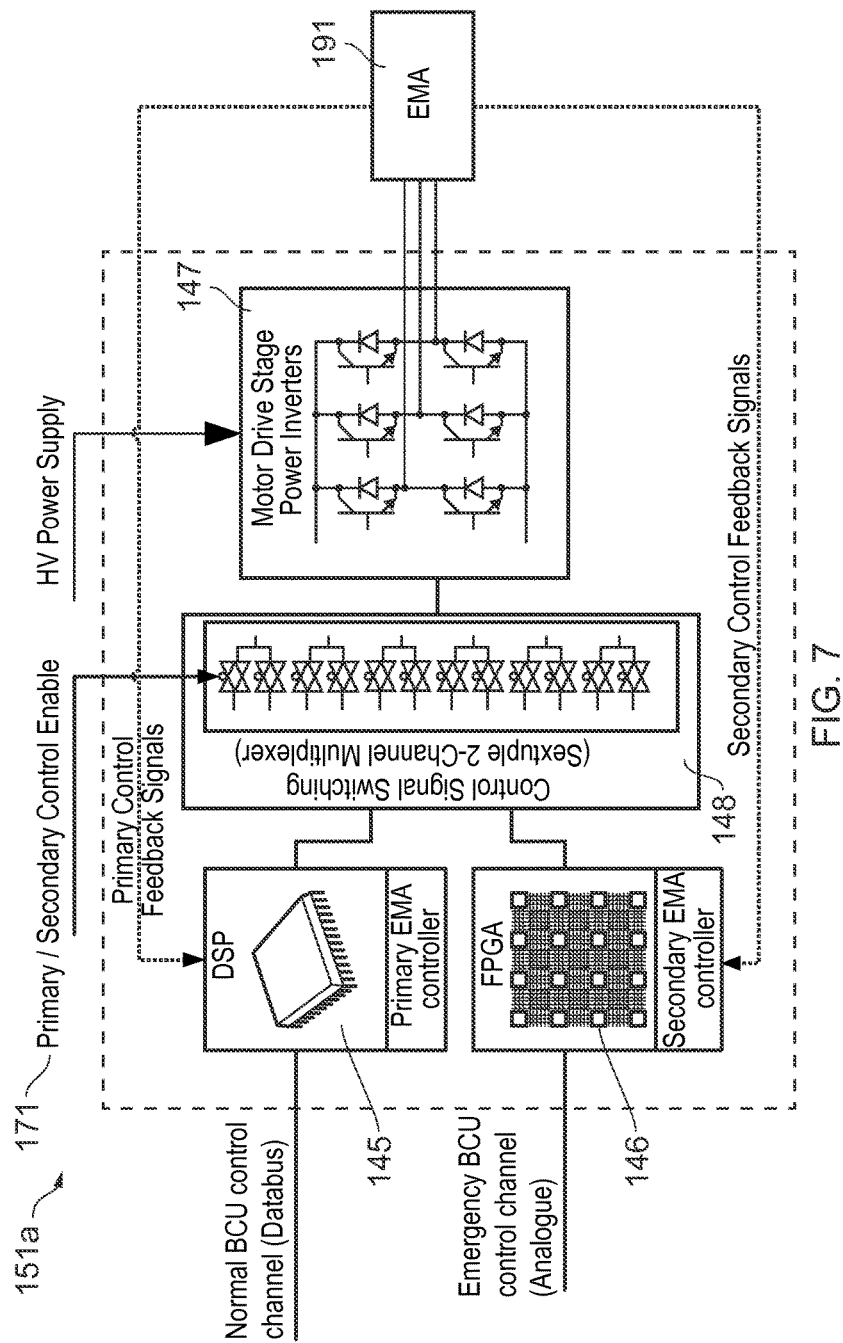
FIG. 7 illustrates in detail the dissimilar motor controllers used in the first example fully smart EMA of FIG. 5.

FIG. 7 illustrates in detail one exemplary embodiment of the dissimilar motor controllers which may be used in the first example fully smart EMA 151a of FIG. 5. The primary (normal) motor controller (PWM signal generator) 145 is a digital signal processor (DSP), and the secondary (emergency) motor controller (PWM signal generator) 146 is a field programmable gate array (FPGA). The source switch 148 is a sextuple 2-channel multiplexer. Feedback signals from the EMA 151a are directed to the primary and secondary controllers 145, 146.

Figure 7A:
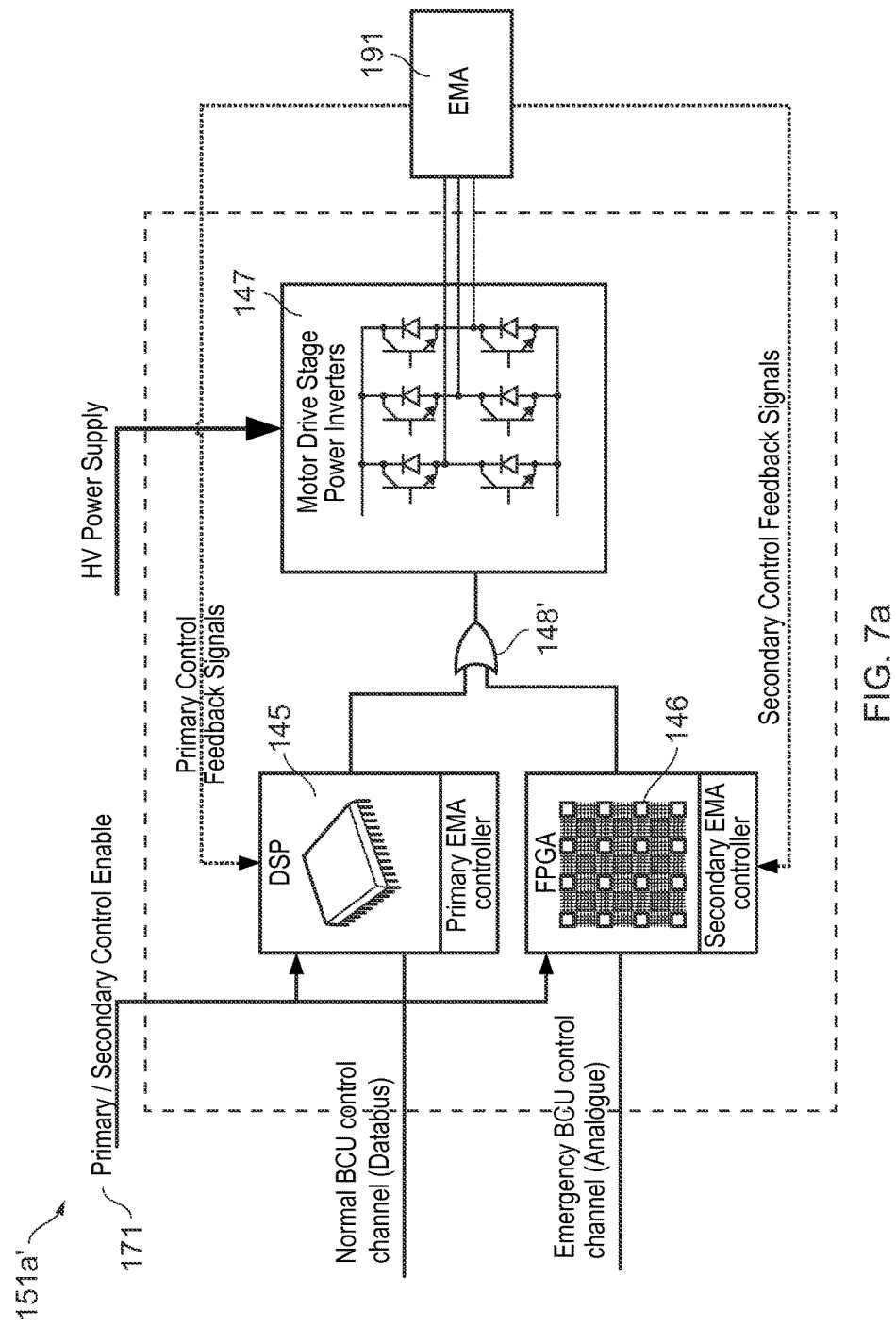
FIG. 7a illustrates in detail an alternative arrangement of the dissimilar motor controllers used in the first example fully smart EMA of FIG. 5.

FIG. 7a illustrates an alternative fully smart EMA (denoted here 151a') similar to the fully smart EMA 151a of FIG. 7 but in which the source switch 148 has been replaced by an OR gate 148'. In all other respects the fully smart EMA 151a' is identical to the fully smart EMA 151a of FIG. 7.

Figure 8:
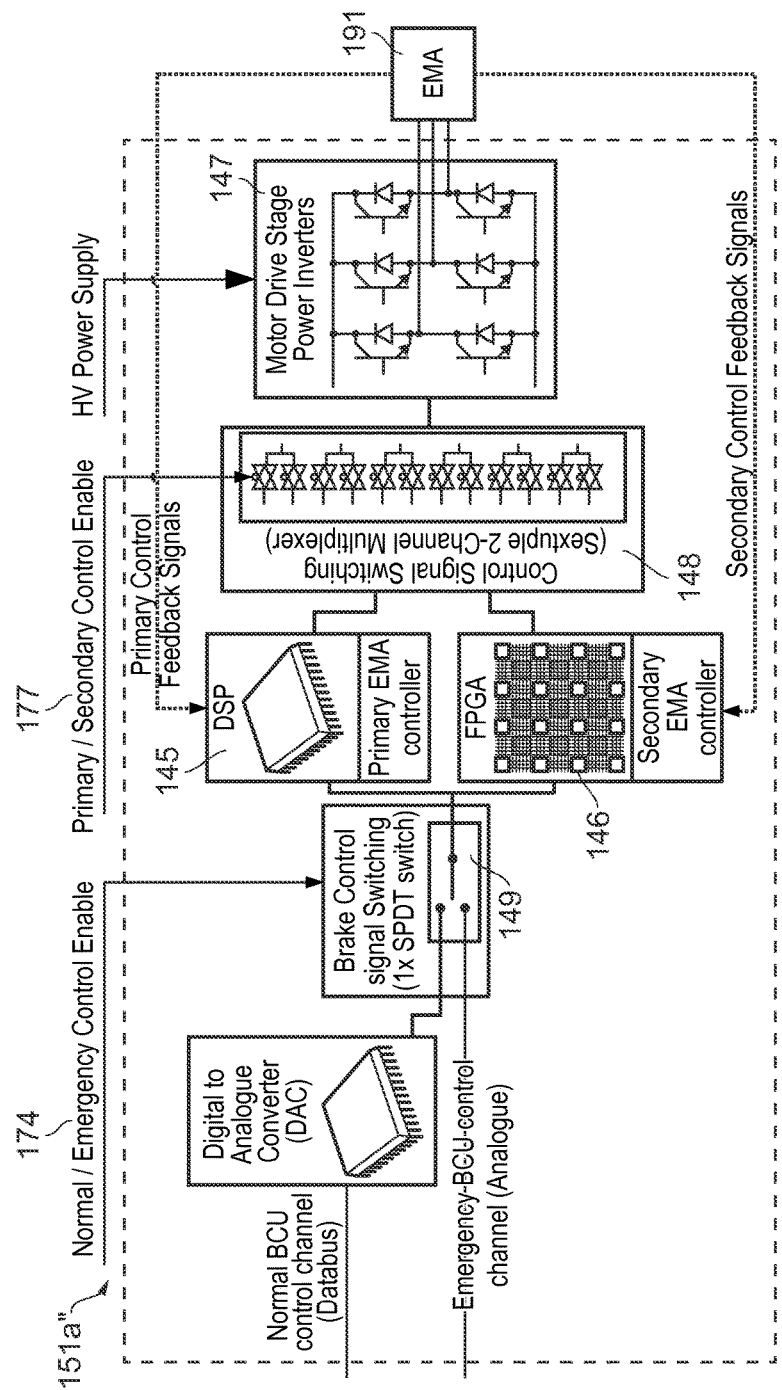
FIG. 8 illustrates in detail the dissimilar motor controllers used in the second example fully smart EMA of FIG. 6.

FIG. 8 illustrates the fully smart EMAC 151a" for use in the second example control scheme of FIG. 6. The normal/emergency brake channel switching 174 is effected by source switch 149, whilst the normal/emergency (primary/secondary) motor control channel switching 177 is effected by source switch 148.

Figure 8A:
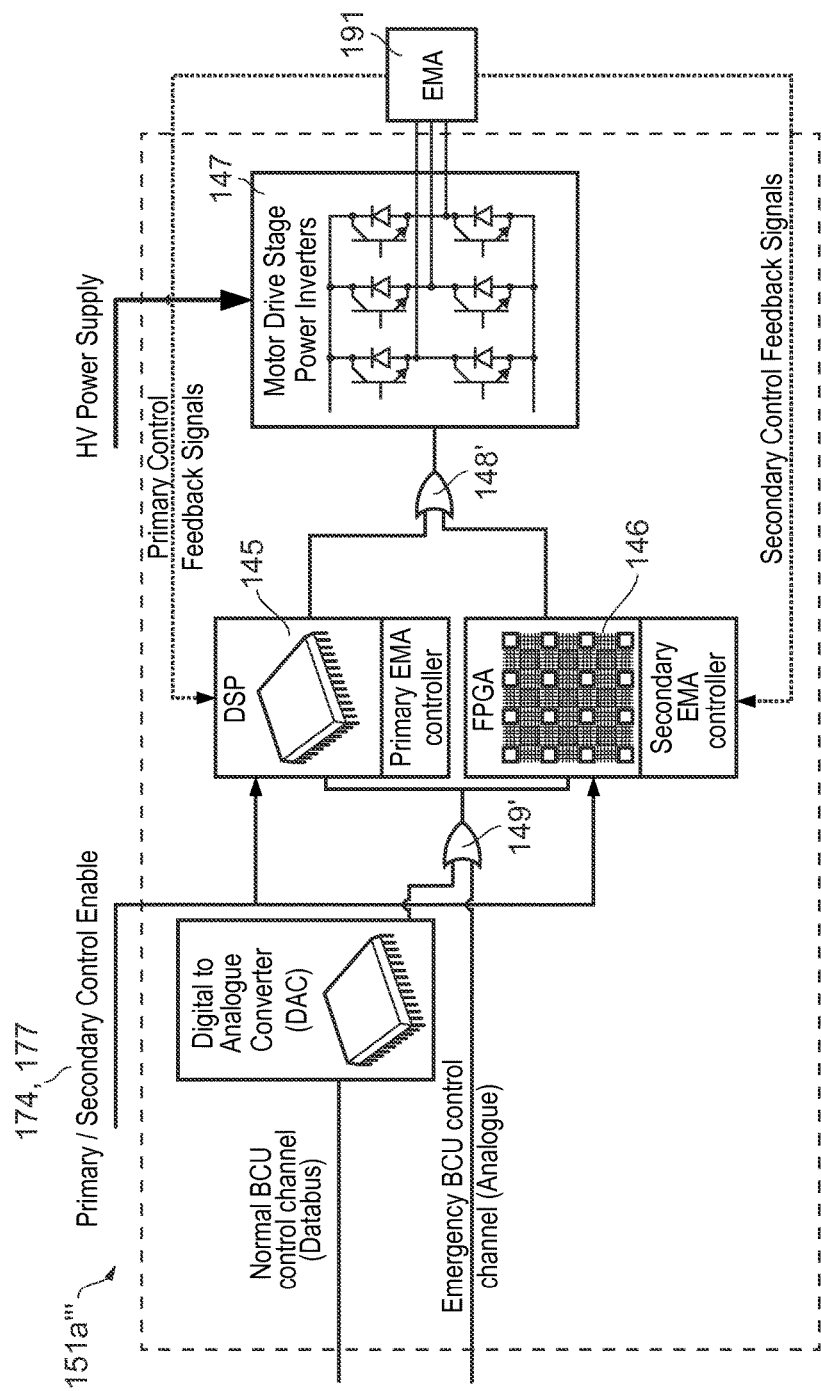
FIG. 8a illustrates in detail an alternative arrangement of the dissimilar motor controllers used in the second example fully smart EMA of FIG. 6.

FIG. 8a illustrates an alternative fully smart EMA (denoted here 151a''') similar to the fully smart EMA 151a" of FIG. 8 but in which the source switches 148, 149 have been replaced by OR gates 148', 149', as described above, and the brake and motor control channel switching is provided by primary/secondary control enable 174, 177. In all other respects the fully smart EMA 151a''' is identical to the fully smart EMA 151a" of FIG. 8.

Whilst in FIG. 7-8a dissimilar technologies are used for the motor controllers 145, 146 the choice of DSP and FPGA should not be construed as limiting. A variety of hardware for PWM signal generating purposes are known including, but not limited to, processor based technologies such as microprocessors, microcontrollers and DSPs; logic based devices such as ASIC (application specified integrated circuits), PLD (programmable logic devices), CPLD (complex programmable logic devices) and FPGAs; and discrete electronics such as transistor based switching circuits for example. Any combination of two similar or dissimilar technologies may be selected for the two motor controllers of the fully smart EMA.

Operation of the braking system 100 will now be described. During normal braking system operation when the pilot, co-pilot, autopilot, etc. operates the cockpit braking control cockpit signals, such as the brake pedal angle, are interpreted by the aircraft avionics at 110 and command and monitoring signals are sent to the side1 and side2 BCUs 121, 122 of the fully smart EMAs. Discrete signals are also sent to the EBPSU hardware enable and allows high voltage power from the aircraft power networks N1, N2 to be supplied to the power inverter stage 147 of the fully smart EMAs.

Either side1 or side2 BCUs 121, 122 of each fully smart EMA compute the brake force required based upon the command signal received from the aircraft avionics and (if available) performs anti-skid computation based upon wheel speeds, before sending a modified braking force command to the normal motor control channel 145 within each fully smart EMA. The normal motor control channel within the fully smart EMA receives the brake force command from the BCUs and (based upon a determination of which BCU is currently active) computes a PWM signal which is sent to the power inverter stage 147 within the fully smart EMA. The power inverter stage uses the PWM signal to modulate the power supply to the EMA 191 of each respective fully smart EMA 151a-d, 152a-d, 153a-d, 154a-d. The EMAs 191 receive the electrical power and produce a clamping force on the respective brakes in order to decelerate or hold stationary the aircraft.

In the case of a failure in one of the BCUs 121, 122 the system is operable to switch sides to the other active BCU 121, 122.

During emergency operation of the braking system two separate cockpit signals are sent, one via databus 112 to the eBCU 123 of one or more of the fully smart EMA, and the other to the EBPSU hardware enable. The EBPSU hardware enable receives the braking enable signal and allows high voltage power to be supplied to the power inverter stage 147 within the fully smart EMAs. The eBCU 123 computes the braking force required based upon the command signal received from the aircraft avionics and (if available) performs anti-skid computation based upon wheel speeds, before sending a modified braking force command to the emergency motor control channel 146 within the respective fully smart EMA. The emergency motor control channel within the fully smart EMA receives the brake force command from the eBCU and computes a PWM signal which is sent to the power inverter stage 147 within the fully smart EMA. The power inverter stage uses the PWM signal to modulate the power supply to the respective EMA 191. The EMAs receive the electrical power and produce a clamping force on the respective brakes in order to decelerate the aircraft.

In the embodiments described above the EBPSUs are disposed remote from the fully smart EMAs. The EBPSUs typically have a large capacitor (a filter as part of the power filtering function of the EBPSU) making it generally unsuitable for incorporation within the fully smart EMAs. However, it is envisaged that capacitor technologies will improve such that the EBPSU functionality may be integrated within each fully smart EMA. The number of EBPSUs would however increase from four to sixteen (one per EMA) in the modified version of the system shown in FIG. 1 and so this option may still not be preferred even with lightweight capacitor technology.

The EBPSUs are operable to convert the main and backup aircraft power network voltages to a power supply used by the routers and fully smart EMAs of the braking system. The invention is applicable to a variety of different aircraft power network voltages, e.g. 115V AC, 270V DC, 540V DC and 28V DC backup battery. The EBPSU may include filtering to protect the aircraft power network from the EMAs and power interlocks.

Figure 9:
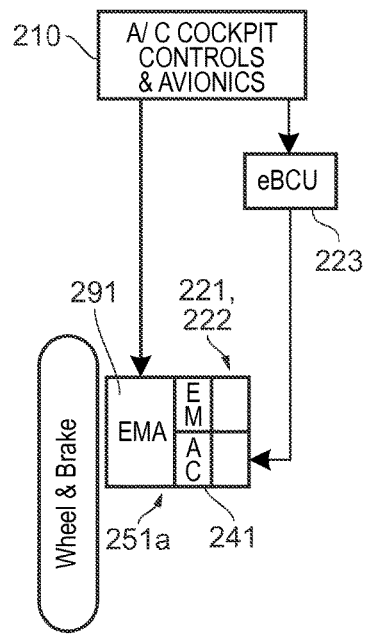
FIG. 9 illustrates a schematic of the control of a single fully smart EMA of a second embodiment of a fully distributed electrically actuated aircraft braking system architecture, in which the fully smart EMAs include electro-mechanical actuator controllers (EMACs), braking control units (BCU) but no emergency braking control unit (eBCU) which is disposed remote from the EMA.

FIG. 9 illustrates a schematic of the control of a single fully smart EMA 251a of a second embodiment of a fully distributed electrically actuated aircraft braking system architecture.

The braking system of the second embodiment shares many similarities with the first embodiment of FIGS. 1-8 and includes the following key difference. In place of the fully smart EMAs in which the normal and emergency BCU functionality is packaged within the fully smart EMA in a single line replaceable unit (LRU), the fully smart EMA 251a has only the (normal) side 1 and side 2 BCU 221, 222 functionality incorporated in the LRU whilst the emergency BCU (eBCU) LRU 223 remains separate and remote from the fully smart EMA 251a.

The fully smart EMA may be adopted in the architecture of FIG. 1 with suitable modifications to incorporate the additional eBCU LRU 223. Either a single eBCU LRU may be provided electrically connected to each of the fully smart EMAs, or to a group of the fully smart EMAs; or a plurality of eBCU LRUs may be provided each electrically connected to one or more of the fully smart EMAs.

Figure 10:
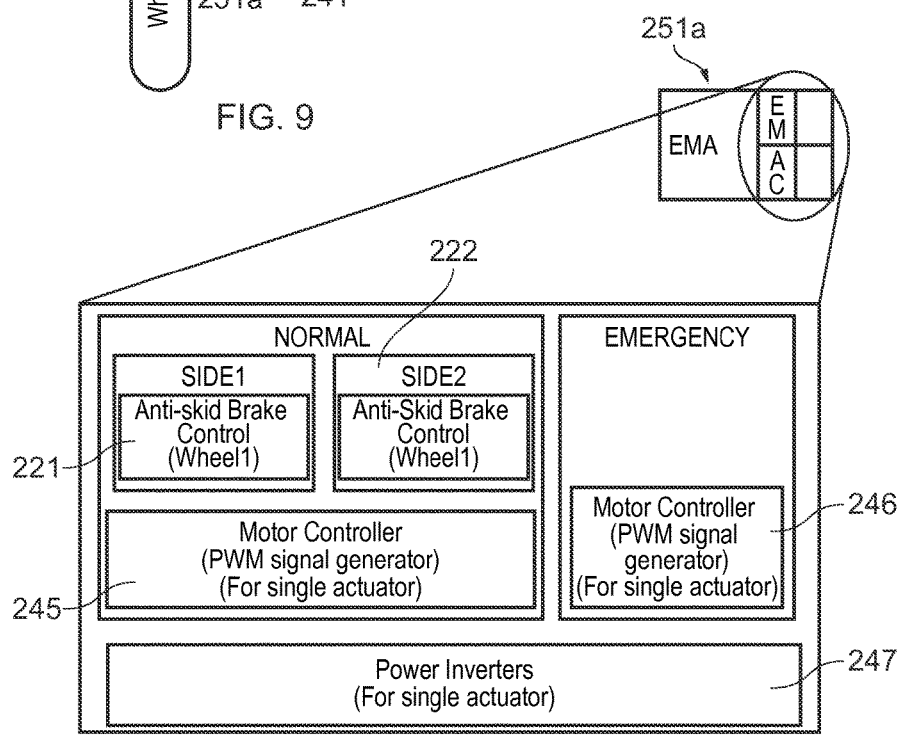
FIG. 10 illustrates a schematic of the fully smart EMA of the second embodiment having dissimilar normal and emergency motor controllers and integrated BCU functionality.

FIG. 10 shows the function blocks of the fully smart EMA 251a in detail, and like reference numerals have been used to denote like parts with FIGS. 1-8, but numbered in the 200 series. The fully smart EMA 251a therefore includes EMAC 241 with motor controllers 245, 246 and power inverter 247, and EMA 291 in addition to the side 1 and side 2 BCUs 221, 222.

Figure 11:
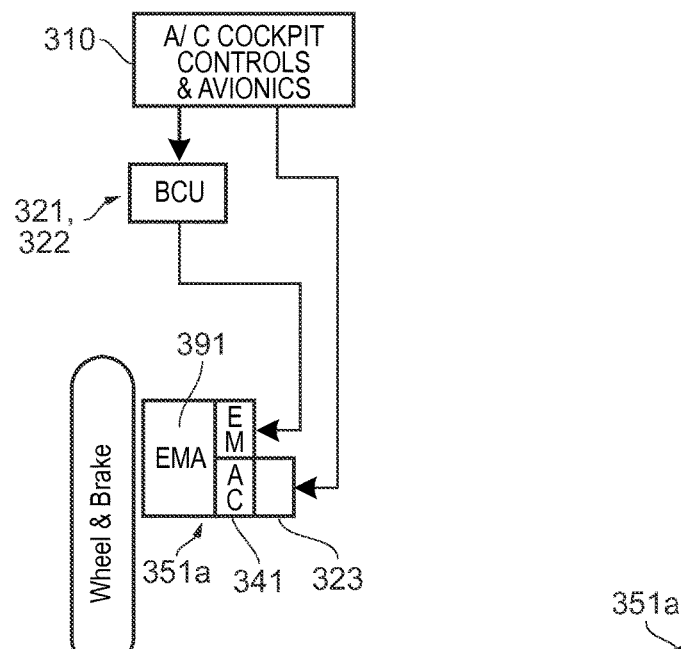
FIG. 11 illustrates a schematic of the control of a single fully smart EMA of a third embodiment of a fully distributed electrically actuated aircraft braking system architecture, in which the fully smart EMAs include electro-mechanical actuator controllers (EMACs), an emergency braking control unit (eBCU) but no normal braking control unit (BCU) which is disposed remote from the EMA.

FIG. 11 illustrates a schematic of the control of a single fully smart EMA 351a of a third embodiment of a fully distributed electrically actuated aircraft braking system architecture.

The braking system of the third embodiment shares many similarities with the first embodiment of FIGS. 1-8 and includes the following key difference. In place of the fully smart EMAs in which the normal and emergency BCU functionality is packaged within the fully smart EMA in a single line replaceable unit (LRU), the fully smart EMA 351a has only the emergency BCU(eBCU) 323 functionality incorporated in the LRU whilst the (normal) side 1 and side 2 BCU 321, 322 LRUs remain separate and remote from the fully smart EMA 351a.

The fully smart EMA may be adopted in the architecture of FIG. 1 with suitable modifications to incorporate the additional BCU LRUs 221, 222. Side 1 and side 2 BCU LRUs may be provided electrically connected to each of the fully smart EMAs, or to a group of the fully smart EMAs; or a plurality of side 1 and side 2 BCU LRUs may be provided each electrically connected to one or more of the fully smart EMAs.

Figure 12:
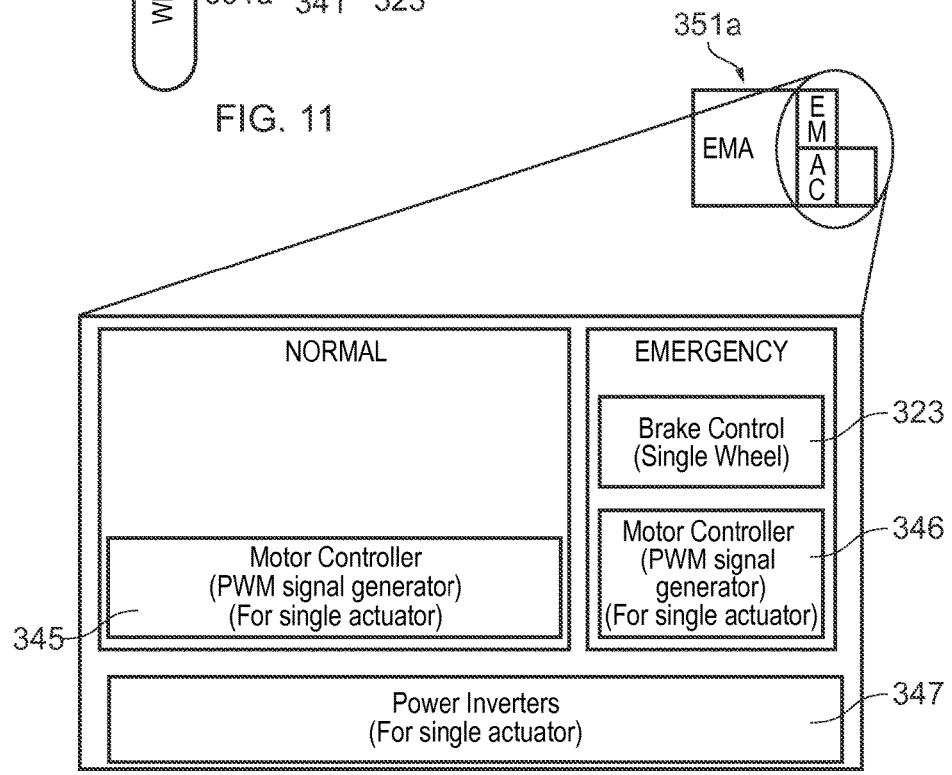
FIG. 12 illustrates a schematic of the fully smart EMA of the third embodiment having dissimilar normal and emergency motor controllers and integrated eBCU functionality.

FIG. 12 shows the function blocks of the fully smart EMA 351a in detail, and like reference numerals have been used to denote like parts with FIGS. 1-8, but numbered in the 300 series. The fully smart EMA 351a therefore includes EMAC 341 with motor controllers 345, 346 and power inverter 347, and EMA 391 in addition to the eBCU 223.

Although the invention has been described above with reference to one or more preferred embodiments, it will be appreciated that various changes or modifications may be made without departing from the scope of the invention as defined in the appended claims.

The invention claimed is:

1. An electrically actuated braking system for an aircraft, comprising:
an electro-mechanical brake actuator (EMAbrake) proximate a wheel of the aircraft, the EMAbrake including a motor;
an electro-mechanical actuator controller (EMAC) including a motor controller for generating a drive signal for the EMAbrake;
a braking control unit for generating a braking force command signal for the EMAC; and
a line replaceable unit (LRU) housing the braking control unit, the EMAC and the EMAbrake, wherein the LRU is proximate a wheel of the aircraft.

2. An electrically actuated braking system according to claim 1, wherein the braking control unit is at least one of: a normal mode braking control unit (BCU) configured to generate a braking force command signal for the EMAC during a normal mode of operation; and an emergency mode braking control unit (eBCU) configured to generate a braking force command signal for the EMAC during an emergency mode of operation.

3. An electrically actuated braking system according to claim 2, wherein the braking control unit disposed in the common LRU is the normal mode BCU, and the system further comprises:
an emergency mode braking control unit (eBCU) configured to generate a braking force command signal for the EMAC during an emergency mode of operation, wherein the eBCU is disposed remote from the BCU.

4. An electrically actuated braking system according to claim 2, wherein the braking control unit disposed in the common LRU is the eBCU, and the system further comprises:
a normal mode braking control unit (BCU) configured to generate a braking force command signal for the EMAC during a normal mode of operation, wherein the normal mode BCU is disposed remote from the eBCU.

5. An electrically actuated braking system according to claim 2, wherein both the normal mode BCU and the eBCU are disposed in the common LRU.

6. An electrically actuated braking system according to claim 1, wherein the EMAC includes a first motor controller for generating a first drive signal for the EMAbrake, and a second motor controller for generating a second drive signal for the EMAbrake.

7. An electrically actuated braking system according to claim 6, wherein the first motor controller and the second motor controller are dissimilar so as to provide protection against common mode failure of the first and second motor controllers.

8. An electrically actuated braking system according to claim 6, wherein the first motor controller is operable on a normal motor control channel, and the second motor controller is operable on an emergency motor control channel.

9. An electrically actuated braking system according to claim 8, further comprising a source switch operatively coupled between the normal and emergency motor control channels and the EMAbrake and configured to switch the EMAbrake control depending on the selected motor control channel.

10. An electrically actuated braking system according to claim 8, further comprising an OR gate operatively coupled between the normal and emergency motor control channels and the EMAbrake and configured to control the EMAbrake depending on the operative motor control channel.

11. An electrically actuated braking system according to claim 6, wherein the first motor controller and the second motor controller each comprises hardware for generating a pulse-width modulation signal.

12. An electrically actuated braking system according to claim 6, wherein the first motor controller and the second motor controller each comprises at least one different hardware component selected from the group comprising: a microprocessor, a microcontroller, a digital signal processor, an application specific integrated circuit, a programmable logic device, a complex programmable logic device, a field programmable gate array, and a transistor based discrete electronics switching circuit.

13. An aircraft including an electrically actuated braking system according to claim 1.

14. An aircraft according to claim 13, further comprising a landing gear having a main leg and a wheel brake assembly, and a router for routing digital communications between a databus running down the main leg and a common LRU associated with the wheel brake assembly.

15. An aircraft according to claim 14, wherein the router is located adjacent a lower end of the landing gear main leg.

16. An aircraft according to claim 14, further comprising a plurality of the common LRUs each having a respective EMAbrake, wherein a plurality of the EMAbrakes are operable to brake the same wheel of the landing gear.

17. An electrically actuated braking system according to claim 3, wherein the BCU is operable on a normal brake channel, and the eBCU is operable on an emergency brake channel.

18. An electrically actuated braking system according to claim 17, wherein the first motor controller is operable on a normal motor control channel, and the second motor controller is operable on an emergency motor control channel, and wherein the normal mode BCU is configured to communicate with the first motor controller but not the second motor controller, and the eBCU is configured to communicate with the second motor controller but not the first motor controller.

19. An electrically actuated braking system according to claim 18, wherein the normal brake channel and the normal motor control channel are coupled so as to form a normal channel, and the emergency brake channel and the emergency motor control channel are coupled so as to form an emergency channel, and the system further comprises a switch for switching between the normal channel and the emergency channel.

20. An electrically actuated braking system according to claim 17, wherein the first motor controller is operable on a normal motor control channel, and the second motor controller is operable on an emergency motor control channel, and wherein the normal mode BCU is configured to communicate with either the first motor controller or the second motor controller, and the eBCU is configured to communicate with either the first motor controller or the second motor controller.

21. An electrically actuated braking system according to claim 20, further comprising a first switch for switching between the normal and emergency brake channels, and a second switch for switching between the normal and emergency motor control channels.

22. An electrically actuated braking system for an aircraft comprising:
   an electro-mechanical brake actuator (EMAbrake) proximate a wheel of the aircraft, the EMAbrake including a motor configured to actuate a brake coupled to the wheel;
   an electro-mechanical actuator controller (EMAC) including a motor controller configured to generate a drive signal to actuate the motor included with the EMAbrake; and
   a braking control unit configured to generate a braking force command signal to actuate the motor included with the EMAbrake;
   wherein the braking control unit, the EMAC and the EMAbrake are mounted in a line replaceable unit (LRU) mounted proximate to the wheel.

* * * * *